United States Patent
Bader et al.

(10) Patent No.: US 9,751,359 B2
(45) Date of Patent: Sep. 5, 2017

(54) METHOD FOR STRUCTURING A PRESS BELT

(71) Applicant: Berndorf Band GmbH, Berndorf (AT)

(72) Inventors: Dieter Bader, Berndorf (AT); Dominik Fasst, Wiener Neustadt (AT)

(73) Assignee: Berndorf Band GmbH, Berndorf (AT)

( * ) Notice: Subject to any disclaimer, the term of this patent is extended or adjusted under 35 U.S.C. 154(b) by 349 days.

(21) Appl. No.: 14/408,680

(22) PCT Filed: Jul. 24, 2013

(86) PCT No.: PCT/AT2013/050143
§ 371 (c)(1),
(2) Date: Dec. 17, 2014

(87) PCT Pub. No.: WO2014/015355
PCT Pub. Date: Jan. 30, 2014

(65) Prior Publication Data
US 2015/0174947 A1 Jun. 25, 2015

(30) Foreign Application Priority Data
Jul. 24, 2012 (AT) .................. A 825/2012

(51) Int. Cl.
*B29C 59/04* (2006.01)
*B44C 1/24* (2006.01)
(Continued)

(52) U.S. Cl.
CPC .............. *B44C 1/24* (2013.01); *B29C 59/002* (2013.01); *B29C 59/04* (2013.01); *B30B 5/04* (2013.01);
(Continued)

(58) Field of Classification Search
CPC ..... B29C 59/04; B29C 59/043; B29C 59/046; B29C 59/002; B29C 33/36;
(Continued)

(56) References Cited

U.S. PATENT DOCUMENTS 2,370,317 A * 2/1945 Koppinger .............. B05C 9/022
101/154
2,849,752 A 9/1958 Leary
(Continued)

FOREIGN PATENT DOCUMENTS

AT 500 312 A1 11/2005
CN 2227008 5/1996
(Continued)

OTHER PUBLICATIONS

International Search Report of PCT/AT2013/050143, dated Jan. 3, 2014.

*Primary Examiner* — Jeffrey Wollschlager
(74) *Attorney, Agent, or Firm* — Collard & Roe, P.C.

(57) ABSTRACT

The invention relates to a method for structuring a press belt (5) made of metal, which has surface areas having three-dimensional embossed structures (6) to be transferred to decorative panels, and a coating is applied to an outer face of the press belt (5) and the embossed structures (6) are then produced by abrading material from or applying material to uncoated regions of the press belt (5), and the application of the coating is carried out by means of a digitally controlled printing method in which the coating is applied in droplet form, wherein before the press belts (5) are structured, the length and width of the embossed structures (6) are determined, taking into account an anticipated elongation of the press belt (5) in an operative state.

4 Claims, 2 Drawing Sheets

(51) Int. Cl.
*B30B 5/04* (2006.01)
*B30B 5/06* (2006.01)
*B29C 59/00* (2006.01)
*B29C 43/48* (2006.01)
*B23P 15/24* (2006.01)
*B29L 31/00* (2006.01)

(52) U.S. Cl.
CPC ............... *B30B 5/06* (2013.01); *B23P 15/24* (2013.01); *B29C 43/48* (2013.01); *B29C 2043/483* (2013.01); *B29L 2031/722* (2013.01)

(58) Field of Classification Search
CPC ..... B29C 33/3835; B29C 43/06; B29C 43/08; B29C 43/10; B29C 43/48; B29C 43/483; B44C 1/24; B30B 5/04; B30B 5/06; B29L 2031/722; B23P 15/24; B23D 1/24
See application file for complete search history.

(56) References Cited

U.S. PATENT DOCUMENTS

| | | | | |
|---|---|---|---|---|
| 3,507,161 A | * | 4/1970 | Hasenwinkle | B27D 3/04 474/102 |
| 3,562,048 A | * | 2/1971 | Loew | B29C 59/04 156/209 |
| 4,007,351 A | * | 2/1977 | Annerhed | B21D 53/14 148/511 |
| 4,544,061 A | * | 10/1985 | Crandall | B30B 9/24 100/118 |
| 4,584,936 A | * | 4/1986 | Crandall | B30B 9/24 100/118 |
| 5,021,102 A | * | 6/1991 | Harreither | C21D 6/02 148/518 |
| 5,038,593 A | | 8/1991 | Pankoke | |
| 5,167,781 A | * | 12/1992 | Kemerer | B29C 35/16 264/166 |
| 5,322,577 A | | 6/1994 | Greten et al. | |
| 5,555,799 A | * | 9/1996 | Amick et al. | B27N 3/24 100/151 |
| 5,611,743 A | * | 3/1997 | Bielfeldt | B27N 3/24 100/151 |
| 6,669,813 B1 | | 12/2003 | Melzer et al. | |
| 2001/0029821 A1 | * | 10/2001 | Yu | B26D 3/10 83/23 |
| 2003/0056885 A1 | * | 3/2003 | Wright | B29C 59/04 156/209 |
| 2004/0131777 A1 | * | 7/2004 | Bader | B23K 26/0846 427/256 |
| 2004/0250707 A1 | * | 12/2004 | Simmel | B27N 3/24 100/151 |
| 2005/0257700 A1 | | 11/2005 | Lutz | |
| 2007/0240585 A1 | * | 10/2007 | Vaish | B29C 59/04 101/3.1 |
| 2008/0010924 A1 | * | 1/2008 | Pietruczynik | B29C 47/0028 52/309.1 |
| 2009/0087506 A1 | * | 4/2009 | Hasegawa | B29C 59/04 425/34.2 |

FOREIGN PATENT DOCUMENTS

| | | |
|---|---|---|
| CN | 1230488 A | 10/1999 |
| CN | 1464333 A | 12/2003 |
| DE | 40 33 230 A1 | 4/1992 |
| DE | 102 28 935 C1 | 7/2003 |
| DE | 102 36 597 A1 | 2/2004 |
| EP | 0 228 570 A2 | 7/1987 |
| EP | 0 546 402 A2 | 6/1993 |
| EP | 1 034 876 A1 | 9/2000 |
| EP | 1 395 443 A1 | 3/2004 |
| EP | 1 561 602 A1 | 8/2005 |
| WO | 96/13374 A1 | 5/1996 |
| WO | 01/21401 A2 | 3/2001 |
| WO | 02/094580 A1 | 11/2002 |
| WO | 2006/041508 A2 | 4/2006 |

* cited by examiner

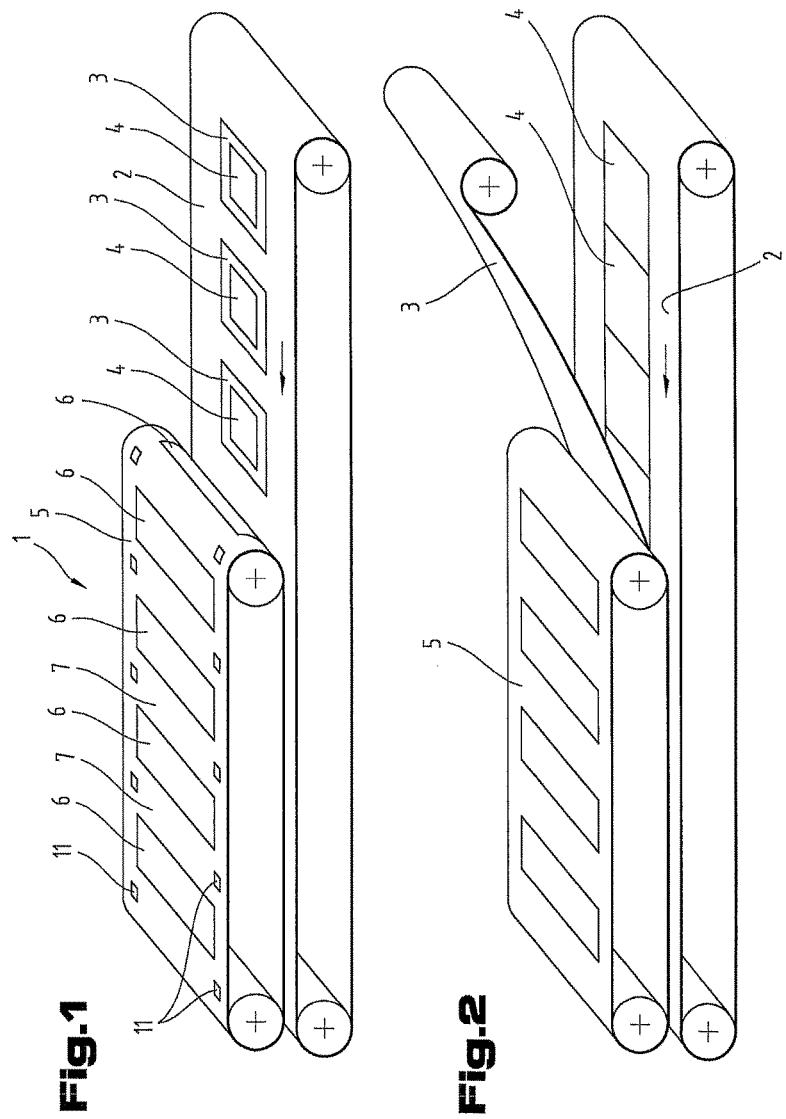

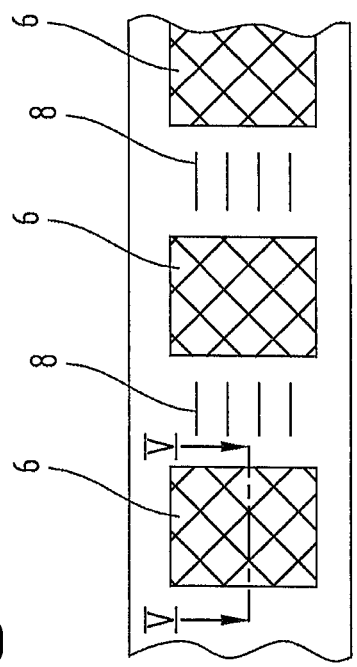
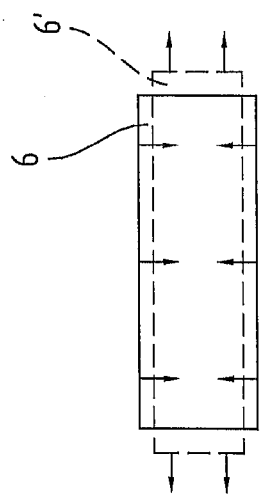
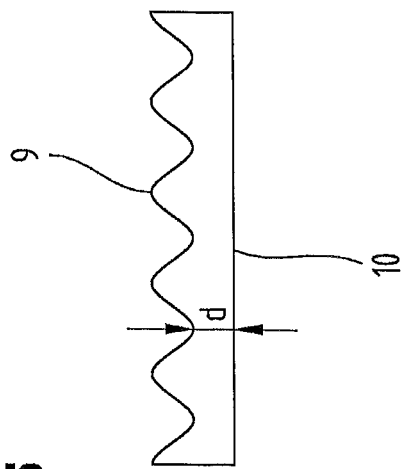

METHOD FOR STRUCTURING A PRESS BELT

CROSS REFERENCE TO RELATED APPLICATIONS

This application is the National Stage of PCT/AT2013/050143 filed on Jul. 24, 2013, which claims priority under 35 U.S.C. §119 of Austrian Application No. A 825/2012 filed on Jul. 24, 2012, the disclosure of which is incorporated by reference. The international application under PCT article 21 (2) was not published in English.

The invention relates to a method for structuring a press belt made of metal, which has surface areas having three-dimensional embossed structures to be transferred to decorative panels, and a coating is applied to an outer face of the belt and the embossed structures are then produced by abrading material from or applying material to uncoated regions of the press belt, and the application of the coating is carried out by means of a digitally controlled printing method in which the coating is applied in droplet form.

The invention further relates to a press belt made of metal, having surface areas with three-dimensional embossed structures to be transferred to decorative panels.

Another object of the invention is a method of producing a decorative panel by means of a press belt made of metal, having surface areas with three-dimensional embossed structures to be transferred to decorative panels.

When producing decorative panels which, in addition to an image, also have a three-dimensional surface structure corresponding to the image, it may be necessary to move the image and the surface structure into an overlapping position in order to achieve a desired optical impression. This movement into an overlapping position is referred to as "synchronization" in this document. Synchronization is deemed to be of great importance above all when producing wood-effect decorative panels. To this end, graining or pores in the wood surface have to be synchronized with corresponding three-dimensional embossed structures.

With decorative panels of this type, an impregnated substrate material provided with an image of a wood surface is usually applied to a support plate and the corresponding three-dimensional structure is embossed by means of a press belt. Such a method is known from AT 500 312 B1, for example.

A relevant press belt and a method of the type outlined above for producing such a press belt are also known from document EP1395443B1.

The disadvantage of the known methods of producing decorative panels is that elongation of the press belt during operation can lead to changes in the length and width of the embossed structures of the belt. However, these changes in the geometry of the embossed structures are not conducive to synchronization between the three-dimensional structure and the image of the decorative panel.

Accordingly, one objective of the invention is to enable the most exact possible synchronization between the three-dimensional structures imparted to the decorative panel by means of the press belt and the image applied to the decorative panel.

This objective is achieved by means of the invention on the basis of a press belt of the type outlined above and, before the belts are structured, the length and width of the embossed structures are determined, taking into account an anticipated elongation of the press belt in an operative state.

By taking into account the anticipated belt elongation during the process of structuring the belts, the effect which when operating with the belts can already be compensated during the process of producing the belts, thereby ensuring an exact synchronization of the embossed structures with the decorative image when producing decorative panels.

Based on one advantageous variant of the invention, two consecutive embossed structures in the longitudinal direction of the press belt are separated from one another by a surface portion of the press belt. Differences in the belt length when producing belts of differing length can be compensated via the gaps between the embossed structures. Accordingly, even with belts of differing length, identical decorative panels can be produced.

Based on one advantageous embodiment of the invention, an intermediate structure is imparted to the surface portion of the press belt lying between two embossed structures, which is different from the embossed structures. The intermediate structure is preferably a neutral structure, for example a structure which does not have any ramifications or wood pores etc., but rather just a simple geometric structure. For example, the intermediate structure may be several parallel lines, diamonds, lattices, etc. By particular preference, the intermediate structure is a pattern which is very similar to a basic pattern of the embossed structure but which, unlike the latter, does not contain any prominent points such as knotholes, for example.

Due to the dimensions to which the industry works as standard, it is standard practice to apply two repetitions of the embossed structures (in other words two decorative patterns) to one support plate. In this connection, it has proved to be of particular advantage if an odd number of embossed structures is imparted on and/or to the press belt. This results in effective self-cleaning of the press belt during operation. The structures are usually embossed in resin-impregnated papers and resin is baked on at points where there is no pressure on the plate. At this stage, it should be pointed out that the expression resin-impregnated "paper" in this document is used synonymously to refer to all types of plastic and curable films or film-type materials which are impregnated with a plastically curable material. The odd number of embossed structures (repeats) ensures that pressure is applied to every gap between two embossed structures during the production process, which are therefore cleaned. This effect can also be achieved or improved by varying the spacing of the embossed structures and hence the size of the gaps.

Based on a preferred variant of the invention, the elongation of the press belt is calculated using an effective belt thickness of the press belt. In this respect, the effective belt thickness may correspond to a minimum distance of the belt outer face from the belt inner face of the press belt after producing the structure.

The aforementioned objective can also be achieved by the invention on the basis of a press belt of the type outlined above which has been structured by the method proposed by the invention.

In a preferred embodiment, the press belt has an odd number of embossed structures. Distances between the embossed structures may also differ.

The underlying objective of the invention can also be achieved by a method of the type outlined above for producing a decorative panel for which a press belt proposed by the invention is used.

Based on one particularly advantageous embodiment of the invention, support plates used to produce the decorative panels are fed on a conveyor system to a pressing area in which the press belt is disposed, and a web of a plastic and curable film or a web of a film-type material impregnated with a plastically curing material is fed continuously to the pressing area and pressed with the support plates by the press belt.

The invention and other advantages will be described in more detail below with reference to examples of embodiments illustrated in the accompanying drawings, although these ae not intended to be restrictive. The drawings are highly schematic, simplified diagrams illustrating the following:

FIG. 1 a perspective view of a device for producing decorative panels;

FIG. 2 a perspective view of another variant of a device for producing decorative panels;

FIG. 3 a plan view of a section of the press belt proposed by the invention;

FIG. 4 a plan view of an embossed structure of a press belt proposed by the invention;

FIG. 5 a section along line V-V indicated in FIG. 3.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

As illustrated in FIG. 1, a device for producing decorative panels, for example laminates with a wood-effect surface or patterned tiles with a stone-effect surface, may comprise a twin belt press 1. Disposed on a bottom belt 2 are support plates 3 on which a paper 4 impregnated with resin or similar and incorporating an image impression is disposed. In the embodiment illustrated in FIG. 1, the pre-cut paper 4 is laid on the support plates 3. Although illustrated differently here, the paper 4 covers the surface of the support plates 3 serving as a support surface essentially completely.

Also provided is a press belt 5 having embossed structures 6 which are imprinted in the resin-impregnated paper 4 in order to obtain a corresponding three-dimensional surface structure in the decorative panel.

The embossed structures 6 of the press belt 5 are spaced apart from one another by what will be referred to as "gaps" hereafter, as may be seen from FIG. 3. As may also be seen from FIG. 3, the gaps may have an intermediate structure 8 which is different from the embossed structures 6 and has a "neutral pattern" such as simple geometric structures in the form of straight parallel lines, lattices, etc. By particular preference, the intermediate structure is a pattern with strong similarities to the basic pattern but unlike the latter, contains no prominent points such as knotholes, for example.

Markers 11 may also be provided in the press belt 5, for example in the form of slots, surface structures, colored markings, etc., to enable a belt elongation or actual position of the belt to be more easily detected during ongoing operation. In the event of a detected shift from a desired position, which will occur if the embossed structures 6 and decorative images are no longer synchronized for example, the belt can be decelerated and stretched in order to correct the positioning error.

To enable the most synchronous possible embossing of the decorative panels with the image to be obtained, the distances between the individual support plates 3 may be predefined. The circulation speeds of the press belt 5, which may be an endless belt, and the belt 2 are timed to match one another accordingly. The surface areas of the embossed structures are also adapted to the size of the decorative panels to be produced. Errors in the synchronization between the embossed structures and decorative images can also be compensated by increasing or reducing the speed at which the support plates 3 are conveyed.

FIG. 2 illustrates another device for producing decorative panels having a three-dimensional surface structure. By contrast with the embodiment illustrated in FIG. 1, the resin-impregnated paper 4 which incorporates the decorative images is fed continuously without having to be cut to size upstream of the press belt. To this end, the resin-impregnated paper 4 is reeled off from a storage roll. The support plates 3 in this embodiment may be fed to the pressing area in which the press belt 5 is disposed aligned in a row without gaps or at a predefined distance from one another.

As illustrated in FIG. 4, during operation of the press belt 5, the belt stretches in the longitudinal direction, as a result of which the peripheral geometry changes from the non-stressed embossed structure 6 to the embossed structure 6'. These changes in the geometry of the embossed structures make it more difficult to obtain an exact synchronization of the embossed structure with the decorative image.

Based on the method for structuring the press belt proposed by the invention, a coating is applied to an outer face of the belt in droplet form by means of a digitally controlled printing method and the embossed structures are then created by abrading material from or applying material to uncoated areas of the press belt.

In order to solve the aforementioned problem of the change in the geometry of the embossed structures 6 during operation, the length and width of the embossed structures 6 are determined taking into account an anticipated elongation of the press belt in an operative state before the belts are structured. The anticipated elongation of the belt can be calculated in a known manner from the modulus of elasticity and the tension which occurs during operation. Given that the press belt is a flat body, the calculation can be made on the basis of flows and a modulus of elasticity dependent on thickness corresponding to a stiffness rather than tensions. In this respect, it has proved to be of advantage to use as the belt thickness for the modulus of elasticity dependent on thickness an effective belt thickness d which corresponds to the smallest distance between the belt front face 9 and belt rear face 9, as illustrated in FIG. 5. The effective belt thickness d therefore lies in the region of the embossed structure 6 and is defined by the depth of the material abraded during structuring and corresponds to a desired value predefined for this purpose.

The anticipated elongation can also be determined on the basis of known values of other belts of the same type or if necessary empirically determined values.

The size of the embossed structure is then scaled in such a way that it assumes the desired size under operating conditions. The basis for this might be, for example, the known dimensions of a decorative image and the position of characteristic points in the decorative image, such as wood pores or flowers, for example. The position of the characteristic points, lines and the dimensions of the decorative image define the desired values for the position of the embossed structures 6 in an operative state. Starting from these desired values for the operative state, the desired values for the operative state can then be converted, on the basis of the elongation in the longitudinal direction and the transverse contraction, into the values that will be necessary to produce the structuring for the areas to be coated by the printer. In the simplest situation, the produced embossed structure 6 compared with the operative state of the press belt 5 will be compressed by the anticipated change of length during operation in the belt longitudinal direction and stretched in the belt transverse direction.

The embodiments illustrated as examples represent possible variants of the endless belt and method of producing an endless belt proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention, as well as all other embodiments not described and illustrated, which fall within the wording of the independent claims.

LIST OF REFERENCE NUMBERS

1 Twin belt press
2 Belt
3 Support plate
4 Paper
5 Press belt
6 Embossed structure
6' Embossed structure
7 Surface portion
8 Intermediate structure
9 Belt outer face
10 Belt inner face
11 Marker

The invention claimed is:

1. Method for structuring a press belt made of metal, which has surface areas having three-dimensional embossed structures to be transferred to decorative panels, and a coating is applied to an outer face of the press belt and the embossed structures are then produced by abrading material from or applying material to uncoated regions of the press belt, and the application of the coating is carried out via a digitally controlled printing method in which the coating is applied in droplet form,
 wherein before the press belt is structured, an elongation of the press belt in an operative state is calculated and a desired size of the embossed structures in the operative state is determined,
 wherein length and width of the embossed structures are then scaled in such a way that the desired size of the embossed structures is assumed in the operative state,
 wherein the elongation of the press belt is calculated on the basis of an effective belt thickness of the press belt, and
 wherein the effective belt thickness corresponds to a value for a minimum distance of the belt outer face from the belt inner face of the press belt after producing the embossed structure.

2. Method according to claim 1, wherein two consecutive embossed structures in the longitudinal direction of the press belt are separated from one another by a surface portion of the press belt.

3. Method according to claim 2, wherein an intermediate structure which is different from the embossed structures is imparted to the surface portion of the press belt lying between two embossed structures.

4. Method according to claim 1, wherein an odd number of embossed structures is imparted to the press belt.

* * * * *